United States Patent
Pillai et al.

(10) Patent No.: US 10,000,638 B2
(45) Date of Patent: Jun. 19, 2018

(54) STORAGE STABILIZED DEVULCANIZED TIRE RUBBER MODIFIED ASPHALT COMPOSITION AND THE PROCESS FOR ITS PREPARATION

(71) Applicants: Chandrasekaran Ramayya Pillai, Pepper Pike, OH (US); Hari Chandra, Pepper Pike, OH (US)

(72) Inventors: Chandrasekaran Ramayya Pillai, Pepper Pike, OH (US); Hari Chandra, Pepper Pike, OH (US)

( * ) Notice: Subject to any disclaimer, the term of this patent is extended or adjusted under 35 U.S.C. 154(b) by 386 days.

(21) Appl. No.: 14/505,539

(22) Filed: Oct. 3, 2014

(65) Prior Publication Data

US 2016/0096960 A1    Apr. 7, 2016

(51) Int. Cl.
| | | |
|---|---|---|
| C08L 95/00 | (2006.01) | |
| C09D 195/00 | (2006.01) | |
| C09J 195/00 | (2006.01) | |
| C08J 3/00 | (2006.01) | |

(52) U.S. Cl.
CPC ............... *C08L 95/00* (2013.01); *C08J 3/005* (2013.01); *C09D 195/00* (2013.01); *C09J 195/00* (2013.01); *C08J 2395/00* (2013.01); *C08J 2417/00* (2013.01); *C08L 2555/80* (2013.01)

(58) Field of Classification Search
CPC ....... C08L 95/00; C08L 2555/80; C08J 3/005; C08J 2395/00; C08J 2417/00; C09D 195/00; C09J 195/00
USPC .......................................................... 524/68
See application file for complete search history.

(56) References Cited

U.S. PATENT DOCUMENTS 4,166,049 A * 8/1979 Huff ........................ C08L 95/00
521/44.5

* cited by examiner

*Primary Examiner* — Peter F Godenschwager

(57) ABSTRACT

This invention relates to a storage stabilized recycled and devulcanized tire rubber modified asphalt composition, which comprises: 65.0 to 90.0% by weight of a neat asphalt, 3.0-50.0% by weight of a recycled and devulcanized rubber from used tires and/or other scrap rubbers, 0.01-15.0% by weight of a compatibilizer/stabilizer derived from Natural or Synthetic Rubbers, which composition passes the "cigar tube" softening point test difference of less than 5° C. between the top and bottom layers; and, the process for the said asphalt composition comprises mixing 65.0% to 90.0% by weight of a neat asphalt, 3.0 to 50.0% by weight of a recycled and devulcanized rubber from used tires, 0.01-10.0% by weight of a compatibilizer/stabilizer derived from Natural or Synthetic Rubbers, using high shear mixers at elevated temperatures of between 120° C. and 175° C. for between 15 minutes to 6 hours, to obtain storage stabilized asphalt composition that is stable in hot storage and transportation conditions.

8 Claims, No Drawings

STORAGE STABILIZED DEVULCANIZED TIRE RUBBER MODIFIED ASPHALT COMPOSITION AND THE PROCESS FOR ITS PREPARATION

CROSS REFERENCE TO RELATED APPLICATION

This application claims the benefit of U.S. Provisional Application EFS ID 17036303, No. 61/886,484 filed on Oct. 3, 2013.

FIELD OF THE INVENTION

The present invention is related to an asphalt composition that is modified with recycled and devulcanized scrap rubbers from tires and other post consumer rubber scraps, and its preparation method. More particularly, it is related to a storage stabilized recycled and devulcanized tire rubber modified asphalt composition and its preparation method.

BACKGROUND OF THE INVENTION

Asphalt has been primary material for water proofing and bonding in pavement and construction industries. Higher performance demands have resulted in modifying the asphalt in various ways to improve its quality. Of importance is the need for asphalt's ability to withstand higher temperatures without softening. The normal range at which most asphalt grades soften is 45 to 50° C. In order to increase the softening point, the asphalt is modified by the addition of various polymers ranging from thermoplastic resins, such as polyethylene, polypropylene to thermoplastic elastomers like Styrene Butadiene Styrene, and Rubbers-Styrene Butadiene Rubber, Natural Rubber, Polybutadiene and so on. At the same time addition of these polymers should not affect the low temperature flexibility of the asphalt polymer composition to avoid freeze/thaw fatigue cracking.

Major challenges in polymer modification of asphalt are miscibility of the polymer with asphalt and its stability which is defined as resistance to phase separation during storage and transportation at elevated temperatures. An additional requirement is that the viscosity of polymer modified asphalt should be low enough to flow and coat the surface of aggregate in pavement construction.

Above all these, is the need to keep the cost of modification sufficiently low.

In order to achieve the economics there had been efforts since 1960s to introduce rubber recovered from used tires and other post consumer scrap rubbers for asphalt modification. The move to use tire rubber stems from need to address the used tire disposal problems as well.

Therefore, there exists a need to develop a recycled used tire and other post consumer rubber scraps modified asphalt that matches the conventional virgin rubber modified asphalts in its quality and cost.

In the past there had been use of recycled polyethylene in a process for the manufacture of recycled polyethylene plastic modified asphalt for use as binder in pavement application. The resulting products using the said Polymer Modified Asphalt improved softening point of asphalt—a desirable property for pavement binder asphalt—and improved resistance to rutting in pavements. However, the polyethylene in the modified asphalt had a tendency to float to the surface on storage and transportation.

Similarly, other common polymer modified asphalt binders that use Styrene Butadiene Styrene (SBS) copolymers as the preferred polymer over many others had the same tendency of phase separation as exhibited by the lighter SBS phase rising to the surface.

Hence, compatibility of the polymer with asphalt is essential to ensure that the properties of the mix are maintained in the finished product to achieve desired storage stability and performance criteria. Phase separation leads to the polymer modified asphalt unsuitable for use in paving binder, roofing applications, and other specific products. In the past, various methods for improving storage stability have been suggested.

One method requires continuous mixing of the asphalt/polymer mixture to avoid phase separation (See, for example, U.S. Pat. Nos. 4,240,946 and 4,314,921) comprises mixing and homogenizing molten bitumen and a polymer in a hot state between 260° C. and 310° C. for several hours. Polymers, especially natural rubber present in tire rubber begin to degrade above 180° C. Hence this is not the solution for recycled tire rubbers that is mostly composed of Natural Rubber, and consequently the performance of the modified asphalt would be impaired due to degraded rubber in the final mix.

In other methods for storage stable asphalt compositions, U.S. Pat. Nos. 5,336,705, 5,627,225, and 5,348,994, disclose a process that uses inorganic acids to stabilize and then neutralize with alkalis in the preparation of polymer modified asphalt compositions. The disadvantages of the processes are high cost and corrosion tendency of the acids on the containers.

In yet another method disclosed in U.S. Pat. No. 5,070,123, it relates to use of an inorganic acid to form an acid treated asphalt mixture before adding modifying polymer to produce storage stable polymer modified asphalt composition. This too has the same disadvantages as the inorganic acid modification described in U.S. Pat. No. 5,336,705 and others above.

However, none of the above methods by themselves or in combination disclose a composition nor the process for storage stabilized devulcanized recycled tire rubber modified asphalt using derivatives of Natural Rubber and synthetic copolymer. Early work in use of ground tire rubber (GTR) in asphalt binders was carried out by Charles McDonald, an engineer with Arizona Department of Transport in 1964. He was issued with patent on use of GTR in pavement mixes around 1970. Since then Arizona had been in the fore front of GTR modified asphalt rubber in binders for pavement application. Other states such as Florida, Virginia, Mississippi and California followed the example. However problems related to preparing a homogenous asphalt/GTR mix resulted in many discontinuing the use of GTR modified asphalt widely. The most serious issues were the ability to dissolving the GTR in asphalt and keeping the GTR suspended without settling to the bottom. GTR manufacturers resorted to producing finer ground powders to overcome these issues, but at higher GTR cost. Yet the problem of dissolving even the finer GTR and keeping it stable without separation during storage at elevated temperatures remain to this day.

As such it has always been desirable to find a solution to making the GTR or its derivatives soluble in asphalt and keeping it stable in suspension during storage before use. There were a number of methods developed to achieve solubility and avoid phase separation, one of which is U.S. Pat. No. 5,095,055 teaches use of branched polymer to an asphalt that has been previously treated with an organic acid. Yet another (U.S. Pat. No. 5,070,123) describes a method of treating the asphalt with inorganic acid prior to addition of modifying polymer to improve the storage stability of the composition. In both these cases the polymers used for modification were, unlike the present invention, virgin polymers and not recycled ground tire rubber.

Yet a more recent patent (U.S. Pat. No. 7,968,628 B2) teaches a process for producing an asphalt and crumb rubber composition that has one or more acids and a cross linking agent for use as pavement binder. It does not mention if the composition is storage stable nor if the crumb is miscible in asphalt so that there is no phase separation.

Hence, this invention relates the solution to ground tire rubber (GTR) derived recycled and devulcanized tire rubber miscibility in asphalt and its storage stability as measured by "cigar tube" separation test which illustrates the phase separation between top and bottom layers of an asphalt/polymer composition through difference in softening point and rheology. The GTR derived recycled and devulcanized tire rubber used in this invention is manufactured and marketed by Quantum Polymer Composites, LLC of Cleveland, Ohio. The product sold under the brand name of "Ecorphalt" can be dissolved in asphalt with the aid of compatibilizers/stabilizers that will also keep the composition stable without separation on storage at elevated temperatures at the terminal and during transportation.

SUMMARY OF THE INVENTION

As used herein, the phrase "asphalt binder" refers to bituminous compositions, sometimes referred to as bitumen, used as a binder to pave roads or other surfaces, or used in construction materials such as roofing, coatings, and water sealants.

The other terms used herein are defined as

"Asphalt" refers to bituminous material derived from petroleum refining and natural sources used to bind aggregates to build pavement.

"Devulcanized tire rubber" (DTR) refers to ground tire rubber from used passenger and truck tires, free of fiber and metal, devulcanized with peptizers and binder, and made into free flowing pellets comprising 50 to 85% by weight of Rubber Hydrocarbon, 15 to 30% by weight of Carbon Black, 10 to 15% by weight of softeners, plasticizers and aromatic Oil, and 5 to 20% by weight of virgin polymer binder.

"Epoxidized Natural Rubber" refers to Natural Rubber that has been epoxidized to between 25 mol % and 50 mol % with following molecular structure:

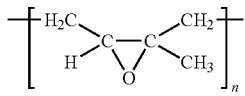

Epoxidized Rubber molecule with epoxy ring on its chain.

"MG Rubber" refers to Methyl Methacrylate grafted Natural Rubber.

"Compatibilizer" refers to any of the above three Natural Rubber derived products—Epoxidized Rubber, MG Rubber and synthetic Styrene Butadiene Rubbers."

"Stabilizer" refers to any of the three Natural Rubber derived products, namely Epoxidized Rubber, MG Rubber and synthetic Styrene Butadiene Rubbers."

Styrene Butadiene Sytrene (SBS) copolymer refers to synthetic rubber with linear or radial structures.

In one embodiment, this invention's product composition is a polymer modified asphalt that comprises 1) asphalt, 2) devulcanized Tire Rubber and 3) a compatibilizer/stabilizer selected from one of the following polymers, namely Epoxidized Natural Rubber, Methyl Methacryalte grafted (MG) rubber and Styrene Butadiene Styrene copolymer.

Further in the process, the devulcanized tire rubber/asphalt binder composition preparation comprises heating neat asphalt to 150 to 180° C., adding devulcanized tire rubber, stirring at high speed in an intensive mixer, and adding while continuing stirring a compatibilizer/stabilizer additive for 20 minutes to 6 hours. Optionally, a virgin polymer may be added immediately after the compatibilizer/stabilizer additive with further stirring for 30 minutes to 6 hours to produce a polymer modified asphalt binder that is storage stable at elevated temperatures.

In both cases the miscibility or solubility of the GTR or Ground Tire Rubber based devulcanized tire rubber is excellent in the presence of the compatibilizer/stabilizer, resulting in a mix with good storage stability.

DETAILED DESCRIPTION OF THE INVENTION

The present invention is related to storage stabilization of devulcanized tire rubber modified asphalt binders and process for making the said storage stabilized devulcanized tire rubber modified asphalt binders. The devulcanized tire rubber modified asphalt binders comprise neat asphalt, devulcanized tire rubber, one or more compatibilizers/stabilizers. Optionally, the compositions may further include one or more polymers. It will be understood that "devulcanized tire rubber" as used herein refers to devulcanized post consumer ground tire rubber, provided they are in powder or pellet form suitable for mixing with asphalt binder. The invention is not limited in this regard, and the devulcanized tire rubber may be powder of any particle size or any size pellets that can be mixed in an asphalt binder for the desired properties.

The devulcanized tire rubber modified asphalt binders of the present invention comprise between about 50% by weight to about 90% by weight neat asphalt, between about 5% by weight to about 50% by weight recycled/devulcanized rubber, and between about 0.01% by weight to about 15% by weight of one or more stabilizers/compatibilizers. Optionally, the devulcanized tire rubber modified asphalt binder may further comprise between about 0.5% by weight to about 30% by weight of one or more virgin polymers.

In one embodiment, the devulcanized tire rubber modified asphalt binder comprise between about 70% by weight and 85% by weight neat asphalt, between about 5% by weight and 15% by weight devulcanized tire rubber, between about 0.1% by weight to about 5% by weight of one or more stabilizers/compatibilizers.

In another embodiment, the modified asphalt binder comprise between about 50% by weight and 90.5% by weight neat asphalt, between about 10% by weight and 30% by weight devulcanized tire rubber, between about 0.5% by weight to about 10% by weight of one or more stabilizers/compatibilizers, and between about 0.5% by weight to about 30% by weight of one or more synthetic polymers.

Preferred stabilizers for use in the devulcanized tire rubber modified asphalt binder of the present invention include Natural Rubber epoxidized to 25 mol %, Natural Rubber epoxidized to 50 mol %, Natural Rubber grafted with Methyl Methacrylate, Styrene Butadiene Styrene copolymer and combinations thereof the above stabilizers and compatibiliers.

The invention is not limited in this regard, and any appropriate epoxidized, grafted and synthetic rubbers known to those skilled in the art may be used in the devulcanized tire rubber modified asphalt binder as storage stabilizer.

In those embodiments of the present invention where virgin polymers are used, preferred polymers include Natural Rubber, styrene butadiene, styrene butadiene styrene (SBS) block copolymer, ethylene vinyl acetate (EVA), polybutadiene rubber (PBR), polyethylene, polypropylene, and combinations of the above polymers. The invention is not limited in this regard, and any appropriate polymer known to those skilled in the art may be used in the devulcanized tire rubber modified asphalt binder.

In a second aspect, the present invention is directed to process for producing the devulcanized tire rubber modified asphalt binder. For those embodiments of the present invention which do not include a polymer additive, the preferred methods for manufacturing the devulcanized tire rubber modified asphalt binder comprise the steps of (1) heating the asphalt to a temperature of between about 150° C. and about 175° C., (2) adding the devulcanized tire rubber, (3) mixing the asphalt and the devulcanized tire rubber with a high shear mixer, such as, for example, a rotor-stator type mixer for a period of between about 15 minutes and about 6 hours, (4) adding the stabilizer/compatibilizer or mix of stabilizers/compatibilizers to the devulcanized tire rubber modified asphalt binder while mixing in a high shear mixer for a period of between about 10 minutes and about 6 hour. Where a polymer is included to the mix, such polymer may be added after the stabilizer (step 4) and further mixed in the high shear mixer for further 30 minutes to 2 hours.

Few select embodiments of the process for the present invention are described below alongside Control mixes 1) without the stabilizer and 2) non devulcanized ground tire rubber for comparison:

Example 1

To neat asphalt heated to a temperature of between about 150° C. to about 175° C., add 15% by weight of devulcanized tire rubber. Mix with high shear mixer at 3600 RPM for 25 minutes. And, add 0.5% by weight of epoxidized Natural Rubber with 50 mol % epoxidation. Continue with a high shear mixer for further 60 minutes.

Example 2

To neat asphalt heated to a temperature of between about 150° C. to about 175° C., add 15% by weight of devulcanized tire rubber. Mix with high shear mixer at 3600 RPM for 25 minutes. And, add 0.5% by weight of epoxidized Natural Rubber with 25 mol % epoxidation. Continue with a high shear mixer for further 60 minutes.

Example 3

To neat asphalt heated to a temperature of between about 150° C. to about 175° C., added 12% by weight of devulcanized tire rubber and mixed with high shear mixer at 3600 RPM for 25 minutes. And, added 0.5% by weight of epoxidized Natural Rubber with 50 mol % epoxidation and continued with a high shear mixer for further 60 minutes.

Example 4

To neat asphalt heated to a temperature of between about 150° C. to about 175° C., added 9% by weight of devulcanized tire rubber and mixed with high shear mixer at 3600 RPM for 25 minutes. And, added 0.5% by weight of epoxidized Natural Rubber with 50 mol % epoxidation and continued with a high shear mixer for further 30 minutes. Further, added 1% Styrene Butadiene Styrene copolymer and continue mixing for further 45 minutes to complete the process.

Example 5

To neat asphalt heated to a temperature of between about 150° C. to about 175° C., add 15% by weight of devulcanized tire rubber. Mix with high shear mixer at 3600 RPM for 25 minutes. And, add 1.0% by weight of Methyl Methacrylate grafted Natural rubber (Grade MG 46). Continue with a high shear mixer for further 45 minutes.

Example 6 (Control 1—SBS Modifier)

To neat asphalt heated to a temperature of between about 150° C. to about 175° C., add 5% by weight of Styrene Butadiene Styrene (SBS) copolymer and mix with high shear mixer for further 30 minutes to complete the process.

Example 7 (Control 2—Devulcanized Tire Rubber without Compatibilizer and Stabilizer)

To neat asphalt heated to a temperature of between about 150° C. to about 175° C., add 15% by weight of devulcanized tire rubber. Mix with high shear mixer at 3600 RPM for 60 minutes to complete the process Example 8 (Control 3—Ground Tire Rubber 40 Mesh)

To neat asphalt heated to a temperature of between about 150° C. to about 175° C., add 15% by weight of Ground Tire Rubber 40 mesh (tire crumb). Mix with high shear mixer at 3600 RPM for 60 minutes.

TABLE 1

Evaluation of Storage Stability of Examples 1 to 5 alongside Controls No. 6, 7 and No. 8

| Property | Example 1 | Example 2 | Example 3 | Example 4 | Example 5 | Example 6 Control 1 | Example 7 Control 2 | Example 8 Control 3 |
|---|---|---|---|---|---|---|---|---|
| Softening point ° C. | 74.0 | 68.0 | 70.0 | 68.5 | 66.0 | 69.0 | 70.0 | 56.0 |

TABLE 1-continued

Evaluation of Storage Stability of Examples 1 to 5 alongside Controls No. 6, 7 and No. 8

| Property | Example 1 | Example 2 | Example 3 | Example 4 | Example 5 | Example 6 Control 1 | Example 7 Control 2 | Example 8 Control 3 |
|---|---|---|---|---|---|---|---|---|
| Cigar Tube | | | | | | | | |
| Top ° C. | 70.0 | 69.0 | 66.5 | 65.5 | 62.0 | 65.0 | 72.0 | 56.5 |
| Bottom ° C. | 68.5 | 67.0 | 64.5 | 64.0 | 62.0 | 48.0 | 70.0 | 75.5 |

Test Methods: ASTM #

| Test | Method |
|---|---|
| Softening Point | ASTM D36 |
| DSR—Dynamic Shear Rheometer | AASHTO T 315 |
| BBR—Bending Beam Rheometer | ASTM D 6084 |
| Cigar Tube Test for Phase separation | ASTM D 7173 |

Full Tests for Performance Grade PG 82-22:

Of the 7 examples, two select embodiments—example 3 and 4—of the composition and process for the present invention were tested for full range of properties at National Center of Asphalt Technology (NCAT), Auburn University, Alabama to confirm that they meet fully Performance Grade PG 82-22 standard, and the test data tabulated alongside control samples and PG 82-22 specification in Table 2 below.

TABLE 2

NCAT evaluation of Examples 3 and 4 with PG 82 - 22 specification

| Property | Example 3 | Example 4 | Specification for PG 82-22 |
|---|---|---|---|
| Dynamic Sheer Rheometer | | | |
| G*/sin(δ)@82° C. | 1.72 kPa | 1.43 kPa | 1.00 kPa min. |
| Dynamic Sheer Rheometer - RTFO aged | | | |
| G*/sin(δ)@82° C. | 3.12 kPa | 3.07 kPa | 2.20 kPa min. |
| Phase angle, δ, 82° C. | 72.9 deg | 71.0 deg | |
| Critical Temperature, ° C. | 86.9° C. | 86.4° C. | 82.0° C. min. |
| Dynamic Shear Rheometer Multiple Stress and Recovery (MSCR) @ 64° C. | | | |
| Jnr@ 0.1 kpa, 1/kPa | 0.1586 | 0.1770 | 1.1500 |
| Jnr@ 3.2 kpa, 1/kPa | 0.2135 | 0.2467 | 1.353 |
| % Recovery @ 0.1 kPa, % | 48.93 | 56.66 | 12.99 |
| % Recovery @ 3.2 kPa, % | 34.45 | 41.67 | 5.616 |
| % Difference, Jnr | 34.60 | 39.38 | 17.68 |
| MSCR Grade Acceptable % Recovery per AASHTO TP 70 | E | E | H |
| Bending Beam Rheometer - PAV aged | | | |
| Stiffness @ -12° C., Mpa | 103 | 107 | 300 MPa max |
| m-value @ -12° C. | 0.312 | 0.317 | |
| Stiffness @ -18° C., Mpa | 193 | 207 | |
| | 0.281 | 0.288 | |
| m-value @ -18° C. | -24.3 | -25.5 | |
| Critical Temperature, ° C. * Separation Test - 48 Hours @ 163° C. | | | |
| Softening Point - Top, ° C. | 66.5 | 65.5 | |
| Softening Point - Bottom, ° C. | 64.5 | 64.0 | |
| Difference | 2.0 | 2.5 | 5.0 Max |
| Performance Grade PG 82-2 | Yes | Yes | |

We claim:

1. A process for making a storage stable devulcanized tire rubber modified asphalt binder comprising: mixing devulcanized tire rubber into neat asphalt heated to a temperature of 120° C. to 175° C. followed by mixing at least one additive selected from the group of epoxidized natural rubber, methyl methacrylate grafted natural rubber, and styrene butadiene styrene block copolymer, wherein the devulcanized tire rubber modified asphalt binder comprises about 5% to about 50% by weight of the devulcanized tire rubber, about 50% to about 90% by weight of the neat asphalt, and about 0.01% to about 15% by weight of the additive, and whereby the devulcanized tire rubber modified asphalt binder attains a high level of storage stability resulting in no separation of devulcanized rubber from the asphalt on a long term storage with an industry standard index of 5° C. or less on testing according to American Standards for Testing Materials Phase Separation Test Method ASTM # D 7173.

2. The process for making the devulcanized tire rubber modified asphalt binder according to claim 1, comprising the steps:
    a. providing neat asphalt in a vessel;
    b. heating the neat asphalt;
    c. adding devulcanized tire rubber to the neat asphalt;
    d. mixing the asphalt and the devulcanized tire rubber with one of a high shear mixer or a low shear mixer for a period of between about 5 minutes and about 6 hours;
    e. followed by adding the additive selected from the group consisting of epoxidized natural rubber, methyl methacrylate grafted natural rubber, and styrene butadiene styrene block copolymer and combinations thereof;
    f. mixing the additive and the asphalt devulcanized rubber mixture with one of a high shear mixer or a low shear mixer for a period of between about 5 minutes and about 6 hours.

3. The process of claim 2, wherein the step of mixing the devulcanized tire rubber in the neat asphalt material is performed in a high or low shear mixer for a period of between 15 minutes and 6 hours.

4. The process for preparing the devulcanized tire rubber modified asphalt binder according to claim 2, comprising first mixing the neat asphalt with the devulcanized tire rubber followed by mixing 25 mol % epoxidized natural rubber using a high shear stirrer for 5 minutes to 6 hours at temperatures between 120° C. and 175° C., wherein the devulcanized tire rubber modified asphalt binder comprises 65 to 90% by weight of the asphalt, 3 to 50% by weight of the devulcanized tire rubber, and 0.01 to 15% by weight of the 25 mol % epoxidized natural rubber.

5. The process for preparing the devulcanized tire rubber modified asphalt binder according to claim 2, comprising first mixing the neat asphalt with the devulcanized tire rubber followed by mixing 50 mol % epoxidized natural rubber using a high shear stirrer for 5 minutes to 6 hours at temperatures between 120° C. and 175° C., wherein the devulcanized tire rubber modified asphalt binder comprises 65 to 90% by weight of the asphalt, 3 to 50% by weight of the devulcanized tire rubber, and 0.01 to 15% by weight of the 50 mol % epoxidized natural rubber.

6. The process for preparing the devulcanized tire rubber modified asphalt binder according to claim 2, comprising first mixing the neat asphalt with the devulcanized tire rubber followed by mixing methyl methacrylate grafted natural rubber using high shear stirrer for 5 minutes to 6 hours at temperatures between 120° C. and 175° C., wherein the devulcanized tire rubber modified asphalt binder comprises 65 to 90% by weight of the asphalt, 3 to 50% by weight of the devulcanized tire rubber, and 0.01 to 15% by weight of the methyl methacrylate grafted natural rubber.

7. The process for preparing the devulcanized tire rubber modified asphalt binder according to claim 2, comprising first mixing the neat asphalt with the devulcanized tire rubber followed by mixing styrene butadiene styrene colpolymer with radial or linear structure stabilizer using high shear or low shear stirrer for 5 minutes to 6 hours at elevated temperatures between 120° C. and 175° C., wherein the devulcanized tire rubber modified asphalt binder comprises 65 to 90% by weight of the asphalt, 3 to 50% by weight of the devulcanized tire rubber, and 0.01 to 15% by weight of the styrene butadiene styrene colpolymer with radial or linear structure stabilizer.

8. The process of claim 2, further comprising optionally a further step of adding a second additive after the first additive is mixed of synthetic rubber selected from the group styrene butadiene rubber, isoprene isobutylene rubber, polybutadiene rubber, or mixtures thereof to the devulcanized tire rubber modified asphalt binder using high or low shear stirrer for an additional 30 minutes to 10 hours at temperatures between 120° C. and 175° C., wherein the second additive is present in 0.01 to 15% by weight.

\* \* \* \* \*